(12) United States Patent
Banal

(10) Patent No.: US 6,883,661 B2
(45) Date of Patent: Apr. 26, 2005

(54) JEWEL CASE HAVING A RESIN BLEND

(75) Inventor: Anthony O. Banal, Fergus Falls, MN (US)

(73) Assignee: Imation Corp., Oakdale, MN (US)

( * ) Notice: Subject to any disclaimer, the term of this patent is extended or adjusted under 35 U.S.C. 154(b) by 98 days.

(21) Appl. No.: 10/206,599

(22) Filed: Jul. 26, 2002

(65) Prior Publication Data

US 2004/0016659 A1 Jan. 29, 2004

(51) Int. Cl.[7] .............................................. B65D 85/57
(52) U.S. Cl. .................... 206/308.1; 220/836; 428/35.7
(58) Field of Search ................................. 206/303, 307, 206/308.1, 310, 524.6; 220/23.4, 836; 428/35.7, 36.5; 524/317; 525/310

(56) References Cited

U.S. PATENT DOCUMENTS

| | | | | |
|---|---|---|---|---|
| 4,640,416 A | * | 2/1987 | Northrup et al. | 206/425 |
| 4,702,369 A | * | 10/1987 | Philosophe | 206/312 |
| 4,742,102 A | * | 5/1988 | Iwata et al. | 524/317 |
| 4,965,321 A | * | 10/1990 | Yuyama et al. | 525/329.7 |
| 5,261,534 A | * | 11/1993 | Krebs et al. | 206/308.1 |
| 5,306,778 A | * | 4/1994 | Ishida et al. | 525/310 |
| 5,779,035 A | * | 7/1998 | Marrelli et al. | 206/233 |
| 6,182,825 B1 | * | 2/2001 | Butcher | 206/308.1 |
| 6,401,920 B1 | * | 6/2002 | Gelardi | 206/308.1 |
| 2002/0037378 A1 | * | 3/2002 | Littlejohn et al. | 428/36.5 |

FOREIGN PATENT DOCUMENTS

| WO | WO 00/72312 A2 | 11/2000 |
|---|---|---|
| WO | WO 00/79526 A1 | 12/2000 |

* cited by examiner

*Primary Examiner*—Jim Foster
(74) *Attorney, Agent, or Firm*—Eric D. Levinson

(57) ABSTRACT

A jewel case 10 for housing at least one piece of recording media is constructed from a blend of resins. The blend includes at least two resins, the first being a stiffer resin and the second, a flexible resin, wherein a clear and flexible jewel case is produced.

19 Claims, 1 Drawing Sheet

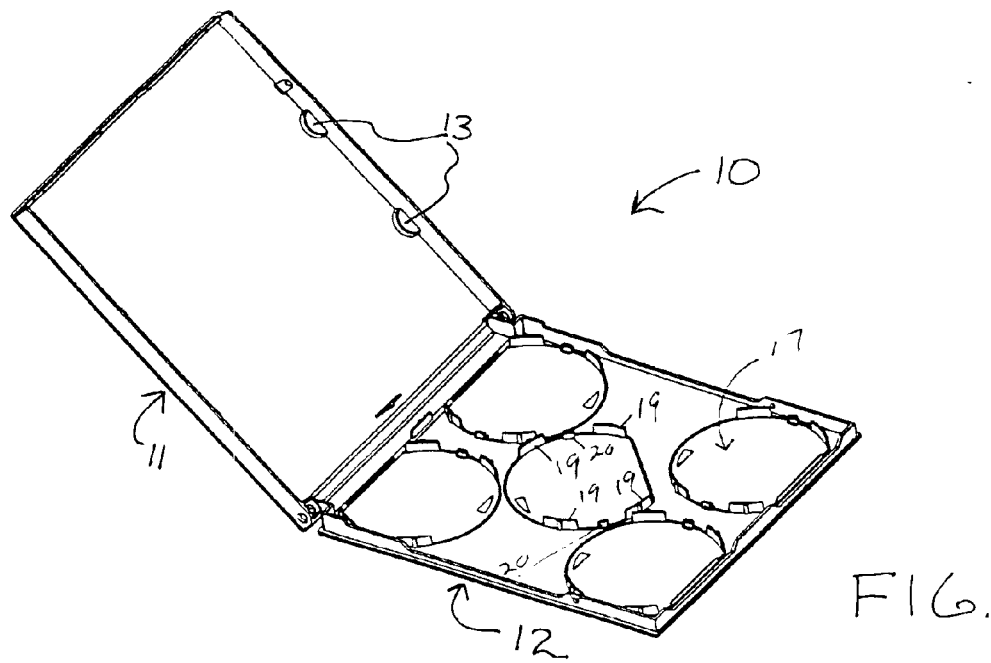
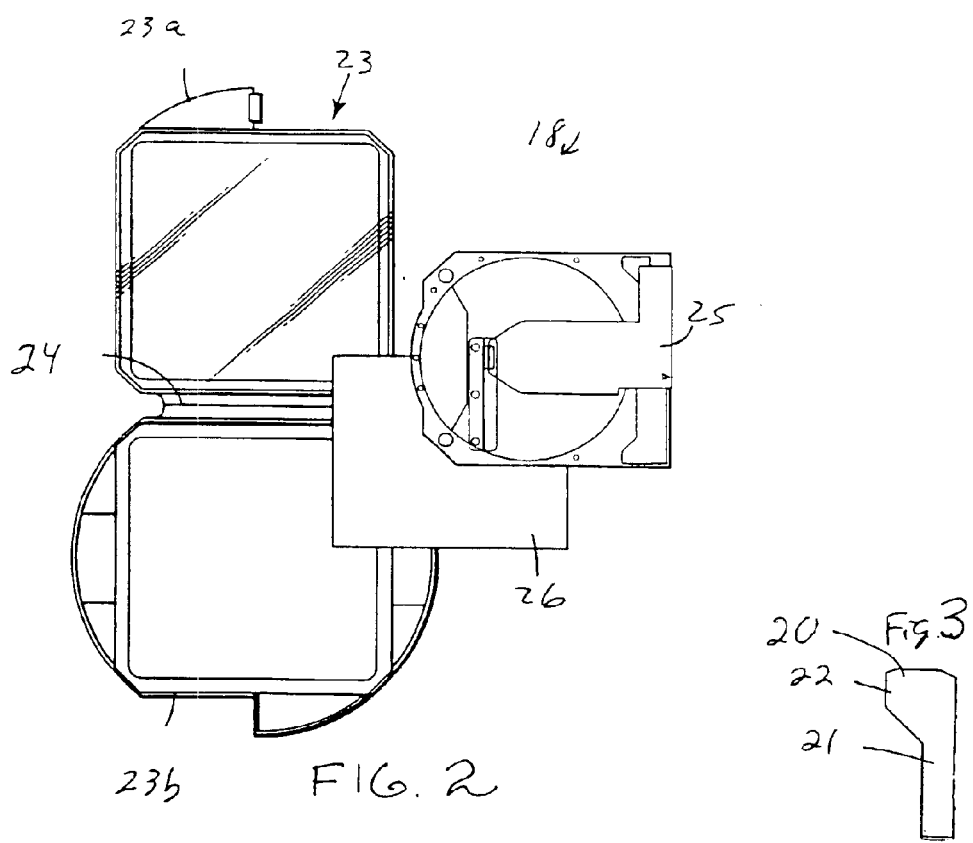
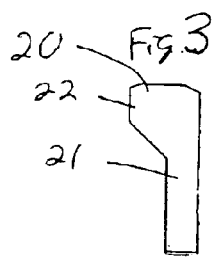

JEWEL CASE HAVING A RESIN BLEND

BACKGROUND OF THE INVENTION

1. Field of the Invention

This invention concerns packaging for recording media, and more particularly to a jewel case having a resin which includes a blend of at least two resins.

2. Description of the Prior Art

In addition to the traditionally insatiable demand of consumers for inexpensive and inexhaustible data storage, data recording and electronic playback systems must also satisfy consumer demand for portability of systems and media, and vendor demands for packaging that effectively promotes sales without encouraging loss of inventory by way of theft. One successful example of commercially successful packaging is the conventional jewel case in which many forms of disc-based recording media are shipped, stocked, and sold. It accommodates conventionally sized "3.5 inch" (120 mm) diameter media such as CD (Compact Disc), DVD (Digital Versatile Disk) and the like.

A drawback of the present jewel case is that it is relatively rigid and cannot bend without breaking. Present jewel cases are clear and transparent which is an important feature so that the item or items inside of the jewel case may be seen. However, the present resin of choice is general purpose polystyrene. While clear, it is quite rigid, brittle and prone to breaking. The flexural modulus of general purpose polystyrene is $440 \times 10^3$ psi. The top or base may be cracked or broken. The jewel case of the prior art simply is not flexible and does not readily deflect or flex without breaking.

SUMMARY OF THE INVENTION

In one embodiment of the present invention, a jewel case is provided for housing at least one piece of recording media. The jewel case includes a base and a cover hinged to the base. At least one media holding feature is within the jewel case and configured to removably hold the media. The jewel case is formed from a blend of a first, stiffer resin and a second, flexible resin, wherein the jewel case is clear and flexible.

In another embodiment, the invention is a jewel case providing housing for at least one piece of recording media. The jewel case includes a base and a cover hinged to the base. At least one media holding feature is within the jewel case and configured to removably hold the media. The jewel case is formed from a blend of a first, stiffer resin and a second, flexible resin. The first resin has a first refractive index similar to a second refractive index of the second resin, wherein the jewel case is clear and flexible.

In another embodiment, the invention is a jewel case for providing housing for at least one piece of recording media. The jewel case includes a base and a cover hinged to the base. At least one media holding feature is within the jewel case and configured to removably hold the media. The jewel case is formed from a blend of a first, stiffer resin and a second, flexible resin. The blend has a flexural modulus of from 393 to $295 \times 10^3$ psi, wherein the jewel case is clear and flexible.

BRIEF DESCRIPTION OF THE DRAWINGS

FIG. 1 is a perspective view of an open jewel case according to the present invention;

FIG. 2 is an exploded view of the media piece component which is insertable into the jewel case shown in FIG. 1; and FIG. 3 is an enlarged view of a portion of FIG. 1.

DETAILED DESCRIPTION OF THE PREFERRED EMBODIMENT

Referring to the drawing, wherein like numerals represent like parts throughout the several views, there is generally disclosed at 10 a jewel case. The jewel case 10 is shown to provide a packaging scheme in which one or more pieces of recorded media are contained within a single package having the conventional jewel case form factor. The form factor of the recording media pieces is sufficiently small enough for several individual pieces of media to be held within the conventional jewel case, if desired. This permits use of the existing jewel case manufacturing equipment and processes where applicable. While the jewel case 10 is shown as receiving five pieces, it is understood that depending upon the size of the media, one media piece or up to five media pieces or even more, if their size permits, could be packaged in the jewel case 10.

The jewel case 10 has a top cover 11 which is hinged to a base 12. The cover 11 pivots between an open position in which the contents of jewel case 10 are accessible and a closed position in which they are not. While deviations are possible, the preferred embodiment is the same or approximately the same dimensions as the conventional "10 millimeter" jewel case, i.e., a shallow rectangular box measuring approximately 140 mm wide, 125 mm high and 10 mm in thickness when closed.

The cover 11 has four tabs 13 that are preferably integrally molded into the cover 11 in a conventional manner. Two tabs 13 are shown on one side of the top cover 11, it being understood that two similar tabs are on the other side. The number and location of tabs 13 is not critical to the invention. The tabs are positioned so that a printed sheet or booklet (neither shown) may be placed inside of the cover 11, typically by sliding it under one or more of the tabs 13. The tabs 13 adequately hold a printed sheet or booklet in place without wrinkling or slippage.

The base 12 defines at least one media holding feature 17. Each media holding feature 17 is sized and shaped to accommodate a recording media piece 18, which is described in more detail hereafter. As illustrated, five media holding features 17 are provided for the same number of media pieces 18, but this is not critical to the scope of the invention. The number of media holding features 17 and media pieces 18 is limited only by the number that will fit in the jewel case 10, which of course depends on the dimensions of both the jewel case 10 and the recording media pieces 18. The exact configuration and arrangement of the media pieces 18 is not critical to the scope of the invention, but for aesthetic and other reasons symmetrically, balanced arrangements are preferred. Also, in the preferred embodiment shown, each media holding feature 17 is circular except for a flattened portion, but again this would depend on the exact form factor of the recording media pieces 18.

Each media holding feature 17 includes four wall segments 19 that are utilized to guide the recording media pieces 18 into the media holding feature 17. As shown, the media holding feature 17 includes two tabs 20 that extend upward. FIG. 3 shows an enlarged view of the tab 20. The tab 20 has an upright section 21 and a head portion 22. The head portion 22 extends into the center of the media holding feature 17. The two head portions 22 provide a snap-in tab to hold the recording media piece 18. The length of the upright section 21 will depend upon the thickness of the recording media piece 18.

In the preferred embodiment shown, the invention permits one or more pieces of data recording media, most preferably (but not necessarily exclusively), those using 32 mm diameter optical recording discs that are expected to be packaged together within conventionally sized jewel cases, such as jewel case 10. This provides cost-efficient manufacturing, distribution and retail display.

One such possible embodiment of recording media is expected to be commercially available under the DATA-PLAY trade name ("DataPlay media"). DataPlay media are believed to be similar to those disclosed in international patent application WO 072312A2 entitled "Removable Optical Storage Device and System" and WO 079526A1 entitled "Combination Mastered and Writable Medium and Use in Electronic Book Internet Appliance". However, the scope of the invention includes other types and formats of media provided they meet the other requirements described above.

FIG. 2 shows a preferred embodiment of a recording media piece 18. Recording media piece 18 is packaged within a clam shell-type container 23, which comprises two mating sides 23a, 23b joined by a hinge 24. When enclosed, the thickness of the clam shell container 23, must be less than that of the jewel case 10 and any other materials (such as printed sheets or booklets that may be present), but is optional whether the cross-sectional shape of either side 12a, 12b (or other) is flat or curved. The thickness of the clam-shell type container 23 is sized and configured to fit underneath the head 22. The recording media 25 is placed inside of the clam shell 23. A printed insert 26 could be used to identify the recording piece 25 (i.e., name of manufacturer, warranty information, and the like), identify the recorded or pre-recorded contents of the recording media 25, and so on. Alternately, the clam shells would be optional and the recording piece 25 could be held by the media holding feature 17.

It is recognized that the jewel case 10, described so far, is just one example of a jewel case that may be utilized which would incorporate the blended resin feature of the present invention. As previously discussed, jewel cases to date are typically made of general purpose polystyrene and are quite brittle and are easily broken or cracked if stressed or flexed. This material has been used because it is very clear and relatively less expensive compared to other clear resins. As previously discussed, the additional snap tabs located in the inside of the jewel box 10 provides for further areas of breakage. This would make automatic assembly even more difficult than for a standard jewel case of general purpose polystyrene, as the snap features (two per recording media 18) could be broken off either during assembly or later when the individual recording pieces 18 are removed. The blend of resins will also greatly improve the cracking in the hinge and tab areas which is also a problem with general purpose polystyrene jewel cases.

The present invention includes the combination of a first, stiffer resin and a second, more flexible resin which still results in a clear jewel case 10 so that the jewel case 10 is still readily transparent. One example of a stiffer resin is an acrylic copolymer such as a styrene-methylmethacrylate copolymer. One example of such a resin is Nova NAS® 90. This material is available from Nova Chemicals Inc.

The second softer resin is a styrene-butadiene copolymer, such as KRO3 K-Resin® from Phillips Petroleum, Bartelsville, Okla. The blend of resin to make the jewel case 10 may range from 10 to 90% of the stiffer resin to 90 to 10% of the more flexible resin. Preferably, the first resin is from 40 to 60% and the second resin is from 60 to 40% of the blend. Applicant has also found that a 50%/50% blend is preferred. The softer material, by itself, is too flexible and the stiffer resin is too stiff and is subject to breaking. One of the unique features of the blend of resins previously described is the clarity of the blend. Typically blends have milky appearances. However, the blend of the previously described resins is very clear. The two resins are blended together, by means well known in the art, to result in a blend that is fully mixed.

The flexural modulus of the NAS® 90 Nova Chemicals' acrylic polymer resin is $490 \times 10^3$ psi and the flexural modulus of the K-Resin® KRO3 is $200 \times 10^3$ psi. This is compared to general purpose polystyrene which has a flexural modulus of $440 \times 10^3$ psi.

The resulting blend at a 50%/50% ratio is very flexible. In supporting the cover or base along one edge and again in the middle, the unsupported end (approximately 5 cm) may be flexed upward or downward approximately 5 cm and no cracking or breaking will occur. At other ratios the blend has a flexure of at least 1.25 cm while having an unsupported length of approximately 5 cm. The resulting blend of a 50:50 ratio would have a flexural modulus of approximately $345 \times 10^3$ psi, using a straight line interpolation. Using a similar straight line interpolation for other blends, the 60% blend of the acrylic polymer resin and a 40% blend of the KRO3 would have a flexural modulus of $374 \times 10^3$ psi. The blend of 40% acrylic polymer resin and 60% KRO3 resin would have a flexural modulus of $316 \times 10^3$ psi. This preferable range would therefore be from $374 \times 10^3$ psi to $316 \times 10^3$ psi for the flexural modulus. Another range of the blend of resins which would vary from $\frac{1}{3}$–$\frac{2}{3}$ to $\frac{2}{3}$–$\frac{1}{3}$ would yield a flexural modulus (using again straight line interpolation) from $393 \times 10^3$ psi to $296 \times 10^3$ psi for the flexural modulus of this preferred range.

Another benefit of the present invention is that because of the flexibility of the jewel case, the jewel case will tend to fall apart at the hinges, rather than break. It is then easy for a user to reassemble a jewel case that is separated as opposed to a jewel case that has been broken or cracked.

As previously noted, an important feature of the present invention is that the resulting blend yields a jewel case 10 that is clear and transparent. This feature is present because the refractive indexes of both resins are similar. The refractive index for NAS 90 acrylic polymer is 1.56 and the refractive index for KRO3 is 1.571. This is measured by the ASTM Test D542. It can therefore be seen that the refractive indexes of the two resins blended together are relatively close to each other. The refractive index of 1.56 is within 0.7% of the refractive index of 1.571. In general, the refractive indices of the two materials should be within 5% of each other, more preferably within 3%, and most preferably within 1%. A range of within 1.0% or less is preferable and yields a clear jewel box, as shown by the blend of NAS 90 and KRO3. It is understood that the 5% range difference cited above may even be greater in certain instances depending upon the resins and still yield an acceptable blend. However, Applicant believes that the similarities in the refractive indexes of the blended resins results in the clear finished product, as opposed to a milky appearing product when the light refractive index becomes too different.

It is understood that the discussion thus far with respect to a transparent jewel case refers to the cover and base, as it is well known in the art to include inserts (such as disc carriers or the clam shell shown in FIG. 2) which may or may not be transparent.

I claim:

1. A jewel case for housing at least one piece of recording media, the jewel case comprising:
    a) a base;
    b) a cover hinged to the base;
    c) at least one media holding feature within the jewel case configured to removably hold the media; and
    d) the jewel case formed from a blend of a first, stiffer resin and a second, flexible resin, wherein said resin blend has a flexural modulus of from $393 \times 10^3$ psi to $295 \times 10^3$ psi, wherein the jewel case is clear and flexible, and wherein the base and the cover separate at the hinge rather than break when flexed.

2. The jewel case of claim 1, wherein the first resin comprises an acrylic copolymer.

3. The jewel case of claim 2, wherein the second resin comprises a styrene-butadiene copolymer.

4. The jewel case of claim 2, wherein the first resin comprises a styrene-methyl methacrylate copolymer.

5. The jewel case of claim 4, wherein the second resin comprises a styrene-butadiene copolymer.

6. The jewel case of claim 1, wherein the second resin comprises a styrene-butadiene copolymer.

7. The jewel case of claim 1, wherein the first resin is from 10% to 90% and the second resin is from 90% to 10% of the blend.

8. The jewel case of claim 7, wherein the first resin is from 40% to 60% and the second resin is from 60% to 40% of the blend.

9. The jewel case of claim 1, wherein the first resin has a flexural modulus of at least 490 psi or greater and the second resin has a flexural modulus of 200 psi or less, and when blended, the resins produce a clear, flexible jewel case.

10. A jewel case for housing at least one piece of recording media, the jewel case comprising:
    a) a base;
    b) a cover hinged to the base;
    c) at least one media holding feature within the jewel case configured to removably hold the media;
    d) the jewel case formed from a blend of a first, stiffer resin and a second, flexible resin, the blend having a flexural modulus of from 393 to $295 \times 10^3$ psi, and
    e) the first resin having a first refractive index similar to a second refractive index of the second resin, wherein the jewel case is clear and flexible, and wherein the cover and base will separate at the hinge rather than break when flexed.

11. The jewel case of claim 10, wherein the first refractive index is within 5% of the second refractive index.

12. The jewel case of claim 11, wherein the first refractive index is within 3% of the second refractive index.

13. The jewel case of claim 12, wherein the first refractive index is within 1% of the second refractive index.

14. The jewel case of claim 1, wherein the flexural modulus is from 374 to $316 \times 10^3$ psi.

15. The jewel case of claim 14, wherein the first resin has a first refractive index similar to a second refractive index of the second resin.

16. The jewel case of claim 15, wherein the first refractive index is within 5% of the second refractive index.

17. The jewel case of claim 16, wherein the first refractive index is within 5% of the second refractive index.

18. The jewel case of claim 17, wherein the first refractive index is within 1% of the second refractive index.

19. The jewel case of claim 1 wherein an unsupported 5 cm length of the blend will flex at least 1.25 cm.

* * * * *